United States Patent [19]

Curry

[11] Patent Number: 4,788,226

[45] Date of Patent: Nov. 29, 1988

[54] POLYAMIDE MEMBRANES

[75] Inventor: Richard Curry, Houghton-Le-Spring, England

[73] Assignee: Domnick Hunter Filters Limited, Birtley, England

[21] Appl. No.: 159,583

[22] PCT Filed: Jun. 23, 1987

[86] PCT No.: PCT/GB87/00439

§ 371 Date: Feb. 18, 1988

§ 102(e) Date: Feb. 18, 1988

[87] PCT Pub. No.: WO87/07849

PCT Pub. Date: Dec. 30, 1987

[30] Foreign Application Priority Data

Jun. 23, 1986 [GB] United Kingdom ............... 8615268

[51] Int. Cl.$^4$ ............................. C08J 9/28; C08J 9/30
[52] U.S. Cl. ..................... 521/184; 210/500.38; 521/61; 521/62; 521/63; 521/64; 521/183; 521/134; 525/432; 528/335; 528/336
[58] Field of Search .............................. 528/335, 336; 210/500.38; 521/183, 184, 61, 62, 63, 64, 134; 525/432

[56] References Cited

U.S. PATENT DOCUMENTS

| | | | |
|---|---|---|---|
| 4,340,480 | 7/1982 | Pall et al. | 210/500.38 |
| 4,408,036 | 10/1983 | Gaymans et al. | 528/335 |
| 4,431,545 | 2/1984 | Pall et al. | 210/500.38 |
| 4,446,304 | 5/1984 | Gaymans et al. | 528/335 |
| 4,450,126 | 5/1984 | Kesting | 210/500.38 |
| 4,460,762 | 7/1984 | Gaymans et al. | 528/335 |
| 4,693,985 | 9/1987 | Degen et al. | 210/500.38 |
| 4,716,214 | 12/1987 | Gaymans et al. | 528/335 |
| 4,719,284 | 1/1988 | Nielinger et al. | 528/335 |
| 4,722,997 | 2/1988 | Roerdink et al. | 528/335 |

FOREIGN PATENT DOCUMENTS

8607544 12/1986 World Int. Prop. O. .

*Primary Examiner*—Morton Foelak
*Attorney, Agent, or Firm*—Bert J. Lewen; Henry Sternberg

[57] ABSTRACT

A microporous membrane suitable for use in microfiltration. The membrane is a hydrophilic skinless sheet, formed of polytetramethylene adipamide, either alone, or in admixture with at least one other polyamide.

8 Claims, No Drawings

POLYAMIDE MEMBRANES

This invention relates to polyamide membranes, and particularly to alcohol-insoluble membranes and their methods of manufacture.

It is known that alcohol-insoluble microporous polyamide membranes may be made by two different types of process, a so-called wet process wherein a membrane-forming film is cast as a thin layer and passes through a quenching solution to remove non-polyamide ingredients and form a microporous membrane while the material is still in the quench bath, or a dry process in which the membrane is formed by relatively slow evaporation of volatile components from a solution of the polyamide. It is recognised that it is not easy to choose polyamide materials that can be successfully formed into membranes by these methods, if the resultant membranes are to have the required desirable properties of being skinless, hydrophilic, (i.e. capable of being rapidly wetted by water) and capable of use in the filtration of particulate and bacterial contamination from a liquid. Such filtration requires pore sizes in the membrane material within the range of from about 0.1 to about 5 microns, that is to say bubble points in the range of about 690 to 48 kPa, with a membrane thickness within the range of about 0.025 mm to about 0.8 mm.

According to the invention we provide a microporous membrane comprising a hydrophilic, skinless sheet of polytetramethylene adipamide, either alone or in admixture with at least one other polyamide.

It has been found that polytetramethylene adipamide (Nylon 4,6) and mixtures of this material with at least one other polyamide can be formed into a membrane having the desirable qualities referred to above. It is presently preferred that the membranes of the invention be formed by a dry process, the polyamide or polyamides first being formed into a casting liquid by dissolving with a suitable solvent, which will preferably be formic acid. The solvent may be present together with one or more co-solvents (for example water, methanol, glycerol or any other lower molecular weight alcohol), and together with a non-solvent in order to give the casting liquid required viscosity and other properties. Suitable non-solvents include such materials as acetic acid, glycerol, polyethylene glycol and water. Membrane formation by a wet process is also possible.

It has been found that the bubble point of membranes cast from Nylon 4,6 alone is dependent on the molecular weight of the nylon, the bubble point increasing as the molecular weight increases. Molecular weights of not less than 20,000 are preferred. Membranes have been successfully cast from Nylon 4,6 having a molecular weight of approximately 21,000, but these have a relatively low bubble point, and in order to produce a membrane having a pore size capable of absolute removal of bacteria it may be preferred to use Nylon 4,6 of higher molecular weights when that particular polyamide is used alone. However, difficulties may be experienced in dissolving higher molecular weight Nylon 4,6 in formic acid, and other solvent systems may be necessary.

For many membranes it is preferred to use a blend of Nylon 4,6 together with one or more other polyamides, desirably selected from polyhexamethylene adipamide (Nylon 6,6), poly-e-caprolactam (Nylon 6) and polyhexamethylene sebacamide (Nylon 610), the additional nylon in the blend having a higher molecular weight than the Nylon 4,6. The additional polyamides are preferably all alcohol insoluble (as is Nylon 4,6), although small proportions of polyamides having a degree of solubility in alcohol may be tolerated.

Preferred blends are those of Nylon 4,6 and Nylon 6,6. In such blends, the Nylon 4,6 is desirably present in up to 25% by weight in order to give preferred strength and water flow properties. The molecular weight of Nylon 4,6 in the preferred blends may be from approximately 10,000 to approximately 26,500, with the range of approximately 10,000 to 21,000 being preferred. Molecular weight towards the lower end of this latter range are more particularly preferred, as they tend to give a more unstable solution that facilitates the casting process. Nylon 6,6 of molecular weight in the range 32,000 to 42,000 is particularly suitable for blending with the Nylon 4,6.

Generally speaking, blends of Nylon 6,6 and Nylon 4,6 have lower bubble points than membranes made exclusively from Nylon 6,6. However, the blends have better chemical compatibility, i.e. are less susceptible to attack by materials being filtered, and have enhanced high temperature resistance, enabling hotter materials to be filtered and facilitating autoclave sterilisation.

In the manufacture of membranes according to the invention using either a wet process or a dry process, the casting liquid is cast onto a substrate. Many of the finally formed membranes have sufficient strengh to enable them to be peeled from the substrate and to be selfsupporting thereafter. Other membranes, while exhibiting good bubble points and water flow rates, do not have that strength, and can thus remain bonded to the substrate for eventual end use. The substrate must, of course, have a porosity that will not significantly reduce flow rate through the composite membrane.

When the membranes are dry cast it is preferred that the temperature is maintained in the range of 15° C. to 75° C., with 20° C. to 50° C. being preferred. The absolute humidity of the casting environment is desirably maintained at a high level. Casting may be effected on a batch basis or a continuous basis.

Examples of membranes in accordance with the present invention, and their manufacture, will now be described in more detail. In the formulations that follow all parts are given by weight.

| EXAMPLE NO | 1 | 2 | 3 |
|---|---|---|---|
| STANYL KS400 | 16.0 | 14.0 | 14.0 |
| FORMIC ACID | 70.1 | 70.9 | 70.9 |
| $H_2O$ as co-solvent | 6.7 | 8.0 | 8.0 |
| Post Additives: | | | |
| ACETIC ACID | 3.0 | 3.25 | 1.75 |
| GLYCERINE | 2.2 | 1.95 | 3.45 |
| WATER (non-solvent) | 2.0 | 1.9 | 1.9 |

Maranyl A-150 is an extrusion grade Nylon 6,6 polymer from I.C.I. with a molecular weight of approx. 36000.

Stanyl KS400 is a polytetramethylene adipamide (Nylon 4,6) of molecular weight approx. 21000, produced by DSM in Holland.

The polyamides were dissolved in the formic acid and co-solvent, and the post-additives were added to the solution in order to form a casting liquid.

After mixing the casting liquids they were each hand cast to form a membrane on a Mylar polyester substrate and dried in an air flow of approximately 128 m/min at 20° C. with a relative humidity of 80%. Discs of the membrane material, each 47 mm in diameter, were tested after removal from the substrate. For each disc, the thickness was measured; the bubble point was measured in accordance with test method ARP 901, issued March 1st, 1968 by the Society of Automotive Engineers, Inc., save that the test cartridge used in that method was replaced by the membrane under test, suitably supported by a disc holder; and the water flow rate through the membrane was measured at the centre of each sample, at 20° C. with a differential pressure of 52 cm of mercury. Thickness and bubble point figures shown in the table are in each case an average of three readings, taken at an upstream region, a centre region and a downstream region of the sample.

TABLE 1

| EXAMPLE | THICKNESS | WATER FLOW (ml/min/cm$^2$) | BUBBLE POINT kPa |
|---|---|---|---|
| 1 | 165 | 1.9 | 317 |
| 2 | 157 | 20.1 | 179 |
| 3 | 178 | unobtained | 214 |

The membranes were self-supporting, microporous, unskinned and hydrophilic, and were suitable for use in microfiltration.

In the following examples 4 to 23 of blended membranes, the polyamides shown were dissolved in formic acid with water and/or methanol as co-solvent. Postadditives were 6.5 parts acetic acid, 3.9 parts glycerol and 3.8 parts water. Membranes were cast using the dry casting method described in the foregoing examples, and measurements were taken again as previously described. In the table the materials are given in parts by weight, bubble point is given in kPa, water flow in ml/min/cm$^2$ and thickness in microns. A-150 indicates Maranyl A-150; KS400 indicates Stanyl KS400. KS200 and KS500 indicate Stanyl KS200 and Stanyl KS500 respectively, both being polytetramethylene adipamides of molecular weight respectively approximately 10,500 and 26,250, in each case produced by DSM in Holland.

| Ex. | A150 | KS200 | KS400 | KS500 | Formic Acid | H$_2$O | Methanol | Bubble Point (kPa) | Water Flow | Thickness |
|---|---|---|---|---|---|---|---|---|---|---|
| 4 | 26 | 2 | — | — | 144.8 | 13 | — | 217 | 26.8 | 195 |
| 5 | 24 | 4 | — | — | 144.8 | 13 | — | 237 | 26.3 | 195 |
| 6 | 22 | 6 | — | — | 144.8 | 13 | — | 192 | 40.5 | 210 |
| 7 | 24 | 4 | — | — | 146.8 | 11 | — | 155 | 61.3 | 180 |
| 8 | 24 | 4 | — | — | 142.8 | 15 | — | 557 | 4.4 | 125 |
| 9 | 24 | 4 | — | — | 144.8 | — | 13 | 579 | 3.8 | 140 |
| 10 | 21 | — | 7 | — | 144.8 | 13 | — | 262 | 17.7 | 225 |
| 11 | 21 | — | 7 | — | 144.8 | 6.5 | 6.5 | 262 | 21.7 | 200 |
| 12 | 21 | — | 7 | — | 142.8 | 7.5 | 7.5 | 462 | 7.1 | 165 |
| 13 | 21 | — | 7 | — | 142.8 | 15 | — | 276 | 19.5 | 200 |
| 14 | 21 | — | 7 | — | 140.8 | 17 | — | 483 | 5.1 | 150 |
| 15 | 24.5 | — | 3.5 | — | 144.8 | 6.5 | 6.5 | 345 | 14.3 | 170 |
| 16 | 24.5 | — | 3.5 | — | 145.8 | 7 | 7 | 600 | 3.5 | 145 |
| 17 | 26 | — | — | 2 | 144.8 | 13 | — | 368 | 12.5 | 140 |
| 18 | 24 | — | — | 4 | 144.8 | 13 | — | 357 | 11.5 | 140 |
| 19 | 24 | — | — | 4 | 146.8 | 11 | — | 146 | 70.8 | 190 |
| 20 | 24 | — | — | 4 | 142.8 | 15 | — | 469 | 6.8 | 140 |
| 21 | 24 | — | — | 4 | 144.8 | — | 13 | 341 | 11.8 | 155 |
| 22 | 21 | — | 7 | — | 144.8 | 12.6 | — | 262 | 18.7 | 216 |
| 23 | 21 | — | 7 | — | 144.8 | — | 13 | 455 | 7.3 | 165 |

All the foregoing examples produced membranes which could be removed cleanly from the substrate on to which they were cast, and which were self-supporting. The membranes exhibited burst strengths in the range of 55 to 159 kPa. Some other membranes made have not been capable of removable from the substrate, but nevertheless the composite membrane and substrate has been capable of effective microfiltration. If required, of course, the membrane may be left on the substrate, even if the membrane is capable of removal and would be self-supporting if removed.

I claim:

1. A microporous membrane comprising a hydrophilic, skinless sheet of polytetramethylene adipamide, either alone or in admixture with at least one other polyamide.

2. A membrane according to claim 1, in which the membrane is of polytetramethylene adipamide alone, the material having a molecular weight of not less than 20,000.

3. A membrane according to claim 1 in which the membrane is a blend of polytetramethylene adipamide and at least one other polyamide selected from polyhexamethylene adipamide, poly-e-caprolactam and polyhexmethylene sebacamide.

4. A membrane according to claim 3 in which the polytetramethylene adipamide has a molecular weight that is lower then the molecular weight of any other polyamide in the blend.

5. A membrane according to claim 3 in which the membrane is a blend of polytetramethylene adipamide and polyhexamethylene adipamide, the polytetramethylene adipamide being present in up to 25% by weight.

6. A membrane according to claim 5 in which the polytetramethylene adipamide has a molecular weight in the range of from approximately 10,000 to approximately 26,500.

7. A membrane according to claim 1, in which the sheet is self-supporting.

8. A membrane according to claim 1 in which the sheet is supported on a porous substrate.

* * * * *